Sept. 13, 1932. J. R. OISHEI Re. 18,594

MOTOR VEHICLE

Original Filed Aug. 24, 1926

Inventor

John R. Oishei

By Bean & Brooks

Attorneys

Reissued Sept. 13, 1932 Re. 18,594

UNITED STATES PATENT OFFICE

JOHN R. OISHEI, OF BUFFALO, NEW YORK, ASSIGNOR TO TRICO PRODUCTS CORPORATION, OF BUFFALO, NEW YORK

MOTOR VEHICLE

Original No. 1,719,444, dated July 2, 1929, Serial No. 131,195, filed August 24, 1926. Application for reissue filed June 21, 1932. Serial No. 618,510.

This invention relates to the mounting of automatic windshield cleaners on automotive vehicles, and particularly to the association of the automatic windshield cleaner relative to the construction of the motor vehicle body at the base of the windshield, whereby the collected moisture and snow on the windshield will be swept or directed downwardly as the reciprocating wiper element of the cleaner approaches its opposite limits of travel.

Heretofore it has been the custom to mount the windshield cleaner motor adjacent the upper edge of the windshield and to have the wiper element depending therefrom for cleaning a definite zone on the windshield. In the oscillating type of windshield cleaners, the mounting of the cleaner adjacent the top of the windshield causes the wiper element to oscillate in a manner to carry the moisture and snow up-hill as the wiper element approaches either of its limits of movement. Consequently, when the wiper element begins its retrograde movement from either limit, the collected moisture also begins to run back over the cleaned surface and beclouds the same to the annoyance of the operator of the automobile. Also when snow is being cleaned from the windshield, the weight of the same throws an added load on the windshield cleaner motor and frequently the snow will pack and bank up to such an extent that the wiper element will be prevented from completing its stroke, which completion is required to reverse the arrangement of the valves in the fluid pressure type of cleaner or to throw a reversing switch or mechanism in an electric type of cleaner, in order to effect the proper operation of the motor.

As a means for obtaining greater efficiency from the automatic type of cleaner, the present invention is designed to cause the wiper element of the cleaner to move so as to throw the collected moisture and snow downwardly at the ends of its strokes whereby the thus collected material will not run back over the cleaned areas of the windshield but rather continue to gravitate or flow away from the cleaned area and thereby enable the operator to see clearly through the entire area cleaned. In accomplishing this desideratum, stress has also been placed upon the mounting and arrangement of the cleaner motor whereby the same is housed and protected from the elements of the weather and disposed so as not to project or extend over into the space occupied by the windshield transparency.

Thus, the objects of this invention are to mount an automatic cleaner mechanism adjacent the base or lower edge of the windshield so as to sweep the moisture and snow in a downward direction as the wiper element approaches the ends of its stroke; to mount the cleaner motor below the cowl and to bring or extend its wiper carrying arm upwardly through a weather guarded cowl construction whereby the cleaner motor will be protected from the weather and at the same time a clean sweep of the wiper or element will be secured in such a manner as to throw the moisture and snow in a downward direction as the wiper element approaches its limits of movement; and to provide a hand control or manipulator on or adjacent the instrument board within the automobile whereby the wiper element may be manually operated and parked when not in use.

Figure 1:
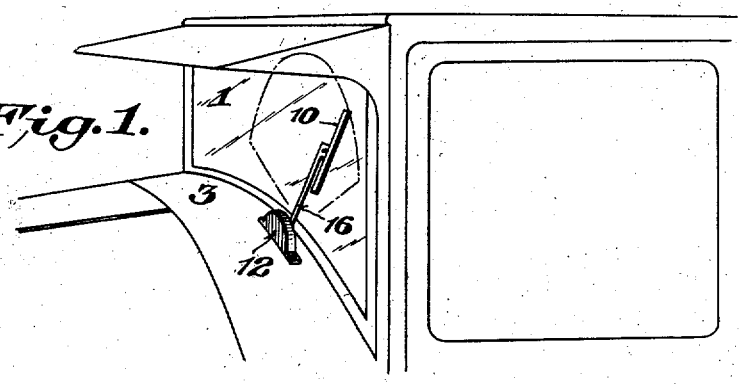
Fig. 1 is a view from without showing the mounting of the windshield cleaner in accordance with the present invention.
Figure 2:
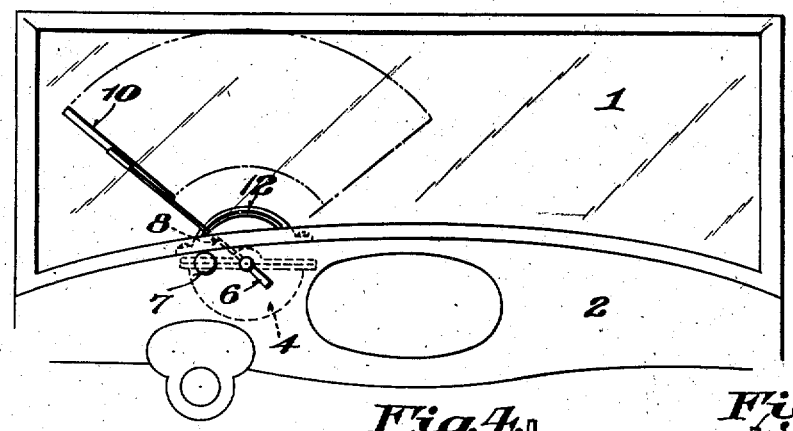
Fig. 2 is a more or less diagrammatic elevation showing the cleaner motor and mechanism mounted behind the instrument board with the wiper element in its operative relation to the windshield.
Figure 3:
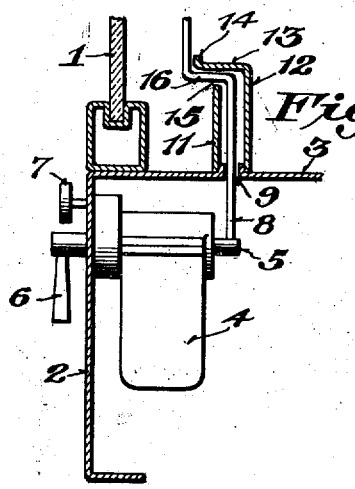
Fig. 3 is a fragmentary vertical section through the swinging type of windshield, the instrument board and the cowl, showing the windshield cleaner motor in its operative position.

Referring in particular to the drawing, numeral 1 designates the windshield, 2 the instrument board, 3 the cowl, and 4 the windshield cleaner motor which may be either of the fluid pressure type or the electric type, and which may be of the wiper oscillating type or of the wiper reciprocating type. The motor 4 may be mounted on suitable brackets, although in the present disclosure the same is mounted directly on the rear side, with respect to the operator of the vehicle, of the instrument board, with its operating shaft 5 protruding through the same and provided with a manipulating handle 6. A motor control button or knob 7 also is provided on the instrument board and is readily accessible from within the car for controlling the operative connection between the motor and its source of power, fluid pressure or electric. The shaft 5 projects at its opposite end from the motor for having the wiper operating arm 8 attached thereto. The cowl 3 is provided with the slot 9 through which the wiper arm extends upwardly so that its upper end may operatively support a wiper element or blade 10 for sweeping across the windshield in an arc concentric with the wiper operating shaft 5.

A weather guard is provided to close the slot 9 to the entrance of rain, wind or snow, said weather guard being simple in construction and comprising a rear upstanding flange 11 and a forward upstanding flange 12, which flanges have their outer marginal portions preferably of semi-circular shape, the arcuate marginal portion of the forward flange 12 being extended beyond the adjacent portion of the flange 11 and bent over the latter, as indicated at 13, so as to substantially close the space intervening the flanges. The closure or shutter portion 13 may be provided with a bead or out-turned edge 14 so as to direct the moisture away from the wiper carrying arm 8. The arcuate marginal portion 13 is spaced outwardly from the marginal flange 11 and defines with the latter an arcuate slot 15 in which operates an offset 16 of the wiper arm 8. In view of the fact that this slot 15 opens rearwardly or toward the windshield, the wiper arm is also offset rearwardly, thereby bringing the outer end of the arm adjacent the windshield for supporting the wiper element. The weather guard comprising the flanges 11 and 12 may be formed of separate parts, or either flange may be turned upwardly from the cowl in providing for the slot 9.

Figure 4:
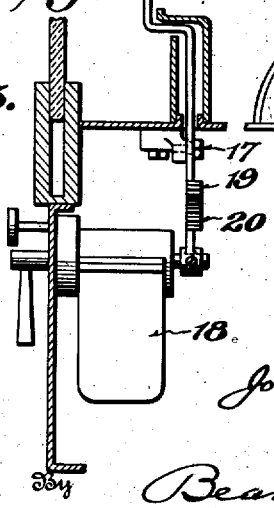
Fig. 4 is a similar view through the sliding type of windshield with the cleaner motor having a lowered point of mounting on the instrument board to permit of vertical sliding adjustment of the windshield transparent panel.
Figure 5:
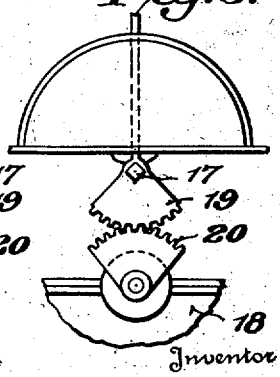
Fig. 5 is a detail view of this lowered mounting.

This improved mounting of the windshield cleaner is especially desirable for windshields embodying a single glass panel either of the swinging type or the sliding type, and where the panel is vertically slidable for ventilation, the wiper cleaner motor may be mounted at a lower point, such as is indicated in Fig. 4. If the conditions require, the wiper operating shaft 17 may be separate and distinct from the motor 18 and connected together as by a sgemental gear 19 and gear 20, or other suitable transmission means may be interposed between the two shafts 17 and 18. Such lowering of the windshield cleaner motor will permit of the windshield panel being lowered to the full extent for which it is designed.

The advantages of placing the windshield cleaner motor beneath the cowl are many. It places the fluid pressure cleaner motor closer to the source of power and enables the use of a larger pipe for establishing communication between the motor and the source of fluid pressure or suction, such as the intake manifold of the motor vehicle engine. Since the motor is disposed behind the instrument board any attendant noises in the operation of the motor are muffled, and further, the motor may be properly lubricated without fear of having any excess lubricant fall therefrom onto the windshield, as would be the case where the windshield motor is mounted adjacent the top of the windshield. The size of the motor may also be considerably enlarged when mounted in accordance with the present disclosure without obstructing the field of vision of the operator of the car. By reason of the handle 6 being disposed on the instrument board the wiper element may be manually manipulated from the instrument board which is much more conveniently located and is more accessible than a cleaner mounted at the top of the windshield.

Substantially the entire weight of the windshield cleaner motor and its operated parts is borne by the vehicle body and none of the weight is supported by the windshield. With the now prevalent and customary methods of mounting the windshield cleaner motor on the upper part of the windshield, the added weight of the accessory motor on the windshield frame, under the constant and more or less excessive vibration set up by the normal driving of the vehicle, tends to strain and weaken the windshield frame construction. The windshield frame construction, by its very nature, is frail as compared with the body or chassis construction of the automobile, and since the motors of the automatic cleaners are heavy, their weight becomes a factor of considerable moment when the cleaner motor is elevated on the windshield so high above the body. Further, in many instances the motorist resorts to the use of two automatic cleaners in which cases the upper and least supported portion of the windshield is made to bear the entire weight of both cleaners and their motors. With the motor lowered, in accordance with the present invention, the windshield is wholly relieved from supporting any additional weight due to the attachment of a windshield cleaner, the windshield cleaner being supported in toto by and on the body of the vehicle.

What is claimed as new is:

1. In combination with the cowl and windshield of an automotive vehicle, of a windshield cleaner motor mounted beneath the cowl and housed thereby, said cowl having a slot therein substantially parallel to the vehicle windshield, a wiper arm operably connected to the cleaner motor and extending upwardly through the cowl slot, a wiper element operably connected to the upwardly projecting arm and movable thereby in wiping contact with the windshield, and a weather guard for the cowl slot.

2. In combination with the cowl and windshield of a motor vehicle, said cowl having a slot parallel with the windshield, a windshield wiper operating shaft extending substantially transversely of the cowl slot and beneath the same so as to be housed and concealed by the cowl, a weather guard mounted on the cowl and substantially closing the cowl slot to the entrance of rain or wind, a wiper arm connected at its lower end beneath the cowl to the shaft and extending upwardly therefrom through and above the cowl slot and said weather guard, and a wiper element carried by the upper end of the arm in wiping contact with the windshield.

3. In a motor vehicle body construction including a windshield, a forwardly extending cowl having a slot parallel to the windshield, and an instrument board beneath the windshield, a windshield cleaner motor housed beneath the cowl and concealed behind the instrument board, a wiper arm operable by the motor and extending upwardly through the cowl slot, said arm operating in the slot longitudinally thereof, a wiper operable over the windshield by said arm, and a motor control arranged on the instrument board.

4. In a motor vehicle body construction including a windshield, a forwardly extending cowl having a slot parallel to the windshield, and an instrument board beneath the windshield, a windshield cleaner motor housed beneath the cowl and concealed behind the instrument board, a wiper arm operable by the motor and extending upwardly through the cowl slot, a wiper operable over the windshield by said arm, a handle mounted on the instrument board and connected through the motor to the wiper for manually operating and positioning the wiper, and a control for the motor.

5. In a motor vehicle body construction including a windshield, a cowl, and an instrument board, a wiper element having wiping contact with the windshield, a wiper operating shaft rotatably mounted beneath the cowl, a wiper element supporting arm connected to the shaft for moving the arm back and forth in an arcuate path, said arm extending upwardly above the cowl through an opening in the body construction for connection with the wiper element, and means on the instrument board for operating the shaft.

6. In a motor vehicle body construction including a windshield and a cowl having a transverse slot extending alongside of the windshield, a weather guard for the slot comprising upstanding flanges along the front and rear edges of the cowl slot with one flange having an arcuate free marginal portion overhanging the companion flange in spaced relation to substantially close the slot to the weather, wiper operating means comprising a rockable shaft journalled beneath the cowl slot on the axis of said arcuate marginal portion, and a wiper arm secured to the shaft and extending upwardly through the cowl slot and between the guard flanges for supporting a wiper element against the windshield, said wiper arm having an offset to pass about the overhanging marginal portion of said flange.

7. In a motor vehicle body construction including a windshield and a cowl having a transverse slot extending alongside of the windshield, a weather guard for the slot comprising upstanding flanges along the front and rear edges of the cowl slot with one flange having a part substantially closing the space intervening the flanges, wiper operating means arranged below the cowl, a wiper arm operable by said means and extending therefrom upwardly through the cowl slot and guard, and a wiper connected to the upper end of said arm.

8. In a motor vehicle body construction including a windshield, a cowl extending forwardly therefrom and provided with an opening, and an instrument board, a wiper element having wiping contact with the windshield, a shaft housed beneath the cowl and concealed thereby and also concealed by the instrument board, and an operative connection between the wiper element and the shaft and extending through the opening in the cowl, the part of said connection in the cowl opening moving about a center and acting to oscillate the wiper element back and forth over the windshield.

9. In a motor vehicle body construction including a windshield, a cowl extending forwardly therefrom and provided with an opening, and an instrument board, a wiper element having wiping contact with the windshield, windshield wiper actuating means housed beneath the cowl and concealed thereby and also by the instrument board, an operative connection between the wiper element and the actuating means and extending through the opening in the cowl, said connection moving in the cowl opening and acting to oscillate the wiper element back and forth over the windshield, and a weather housing for the cowl opening extending upwardly from the cowl and in front of the windshield, said operative connection extending through and operating in said weather housing.

10. In a motor vehicle body construction including a windshield, a body portion extending forwardly therefrom and provided with an opening, an instrument board beneath the windshield and within the body, a wiper element having wiping contact with the windshield, a windshield cleaner mechanism housed beneath the forwardly extending body portion and concealed thereby, and an operative connection between the wiper element and the windshield cleaner mechanism and extending through the opening in said body portion, said connection moving in the body opening and acting to oscillate the wiper element back and forth over the windshield, the operative connection between the wiper element and the concealed windshield cleaner mechanism including transmission gearing through which the wiper element is oscillated on the windshield from the concealed cleaner mechanism.

11. In a motor vehicle, the combination with a vehicle body having a windshield and a forwardly extending body portion provided with a weather-proof opening therein, of a windshield wiper adapted to contact with the glass of said windshield but having no mounting connection with the latter, drive means, means extending from within the body through the weatherproof opening and connecting the drive means to the wiper for operating the latter, said connecting means including a pivotally mounted wiper actuating arm and means connecting the arm to the drive means, and means for mounting and concealing the drive means within the body whereby portions of the vehicle body will shut from view said drive means and baffle and muffle the sound of operation thereof and whereby said wiper will be caused to move by said drive means, the latter being within the body and protected from the weather.

12. In a motor vehicle body construction including a non-rotatable windshield and a body portion extending forwardly from adjacent the lower edge thereof, a windshield wiper oscillatable on the windshield within the limits of an arc of approximately 180°, a drive shaft concealed within the body construction, and means for supporting the wiper for oscillatory movement on the windshield, said supporting means including means for operatively connecting the wiper member to the drive shaft whereby said wiper is oscillated on the windshield by and during operation of the drive shaft, and a substantially weather-proof opening from the inside of said body portion to the outside thereof for housing a portion of said supporting and connecting means.

JOHN R. OISHEI.